UNITED STATES PATENT OFFICE.

WM. H. CARVER, OF COVINGTON, KENTUCKY, AND J. BECKLEY, OF CINCINNATI, OHIO.

IMPROVEMENT IN MASTIC ROOFING.

Specification forming part of Letters Patent No. 18,186, dated September 15, 1857.

*To all whom it may concern:*

Be it known that we, W. H. CARVER, of Covington, Kentucky, and J. BECKLEY, of Cincinnati, Ohio, have invented a new and useful Improvement in Roofing-Cements; and we do hereby declare that the following is a full and exact description of the method of making, compounding, and applying the improved cement to roofing and similar purposes.

The main ingredient in quantity used in our improved roofing-cement, as in most all others, consists in coal-tar, which is known to contain a large proportion of ammonia; and the nature of our improvement consists in the manner of mixing and compounding the ingredients composing our cement, by which we destroy the ammonia contained in the coal-tar with the use of quicklime, combined with the method of mixing, compounding, and preparing the cement for use, which ammonia, if allowed to remain in the cement, will eat the canvas on which the cement is spread when being applied to the roof, and in a few years will eat up and entirely destroy the roofing properties of the coal-tar itself, and at the same time with our method of mixing and compounding the cement we deprive it of the residue of lime, (more properly speaking the sulphate of lime,) which, if allowed to remain in the cement or coal-tar, the tar in a few weeks would thicken up, so it could not be used without heat, and would render the cement, when laid on the roof, brittle and liable to crack, which brittleness and cracking have been the greatest defects of roofing-cement in which lime is used, owing to its drying and hardening properties. Beeswax is another ingredient we employ in our cement, the uses of which will be fully described in the following specification.

To enable others skilled in the art to make and use our cement, we will proceed to describe the method of mixing, compounding, and applying it to use.

In a kettle sufficiently large pour forty gallons of coal-tar. Stir in twelve pounds of quicklime pulverized and sifted. Then apply fire to the kettle, gradually increasing the heat until the tar boils, and stir it occasionally to prevent the lime from settling on the bottom of the kettle. Boil it gently not to exceed twenty minutes. Then run the tar off into a cooling-kettle. After it ceases to boil add six pounds of beeswax previously melted and stir it in well. Then let the lime settle to the bottom and run off the tar again into another kettle, the tar by this time being quite cool. Then stir in two and a half gallons of virgin-rubber solution (rubber dissolved in pure turpentine or best camphene) and eight pounds of shellac solution, (three and one-third pounds of the best shellac dissolved in about three quarts of ninety-two per cent. alcohol,) which completes the cement for use.

This cement can be applied without the use of fire to render it fluid. For the extreme north the per cent. of wax must be increased one-half, or doubled would be better. For the extreme south the per cent. of shellac may be increased one-third.

The use of the above ingredients is as follows: The use of quicklime in the manner above described is for destroying the ammonia contained in the coal-tar, which is so disastrous to roofing-cements containing coal-tar, as it not only eats out the canvas on which the cement is spread, but will in a few years eat up the coal-tar itself. It is necessary that the tar should be heated to at least boiling-point, so that the ammonia may become thoroughly saturated with the quicklime and become decomposed, which it will not do while cold. Boiling also assists in throwing off in vapor a portion of the naphtha and watery ingredients contained in the coal-tar, thereby giving a more substantial body to the coal-tar. It is also necessary to let the lime (now sulphate of lime) settle and separate it from the coal-tar before mixing in the other ingredients. If the lime remains in the tar, the cement will in a few weeks thicken up, so that it cannot be used without heat. It, moreover, renders the cement, when laid upon the roof, brittle and liable to crack.

The use of coal-tar is for giving body to the cement.

The use of beeswax (which will not evaporate or dry out) is to prevent cracking after the volatile parts in the tar have evaporated, and in cold weather no roofing-cement of which we are aware contains an ingredient to prevent cracking, but, on the contrary, contains ingredients to make them dry, which causes them to crack in a few years and leak. We use no ingredients to make our cement dry, as evaporation of volatile parts and action of atmosphere will dry it sufficient.

The use of virgin-rubber solution is to give elasticity to the cement in expansion and contraction by heat and cold.

The use of shellac is to harden the outside surface, so that it may not run in extreme warm weather or stick to the feet when trod upon.

This cement is applied to use as follows: On the sheathing-board lay one thickness of dry roofing-paper. On this lay one or one and a half thicknesses of saturated paper, always giving sufficient lap and breaking joints. On these tack good strong brown muslin. The use of dry paper is to prevent the tarred or saturated paper from adhering to the sheathing-boards, and thereby counteract the swelling and shrinking of sheathing. The tarred paper and canvas (which on the first coat of the cement is thoroughly saturated and adheres to tarred paper) is to form a foundation for cement. Each coat is spread with a broad brush and sharp sand sifted or thrown evenly on it. The first coat contains coal-tar prepared as before specified and wax. The second is same as first with rubber solution added. Third is same as second with shellac solution added. The reason for laying each coat as above is, the first is mainly to saturate the canvas and prepare a better foundation for second coat. Therefore the rubber is not needed. The shellac is used to harden the surface, and must be used only in the last coat, the object being to keep the two first coats soft as long as possible, which will assist to prevent it from cracking by remaining in a plastic state, while the outside coat is made hard to resist all ordinary external forces the roofs are generally subject to by adding the shellac in the last coat.

We are aware that nearly all, if not all, the ingredients have been used composing our cement, and therefore do not wish to be understood as claiming any of them when taken separately, nor the whole of them when used together; but What we do claim as our improvement, and desire to secure by Letters Patent, is—

The precise manner employed of mixing and compounding the ingredients composing the cement, when combined with the proportions of ingredients as specified, by which process of mixing and compounding and combination of ingredients and applying the cement to use we are enabled to decompose or destroy the ammonia contained in the coal-tar to prevent it from destroying the cement and eating the canvas on which it is spread, and at the same time produce a cement that is not brittle and subject to cracking, but hard enough to resist forces that roofs are generally subject to, and at the same time elastic enough to expand and contract to suit all conditions of heat and cold and make the cement water-proof.

WM. H. CARVER.
J. BECKLEY.

Witnesses:
CHARLES H. FOX,
J. B. POWELL.